(12) United States Patent
Lee et al.

(10) Patent No.: US 8,292,519 B2
(45) Date of Patent: Oct. 23, 2012

(54) OPTICAL MODULE

(75) Inventors: Jeong-Seok Lee, Anyang-si (KR);
 Sung-Wook Kang, Seoul (KR);
 Jun-Young Lee, Yongin-si (KR);
 Yu-Dong Bae, Suwon-si (KR);
 Jeong-Hwan Song, Seoul (KR)

(73) Assignee: Samsung Electronics Co., Ltd.,
 Samsung-ro, Yeongtong-gu, Suwon-si,
 Gyeonggi-do (KR)

( * ) Notice: Subject to any disclaimer, the term of this patent is extended or adjusted under 35 U.S.C. 154(b) by 512 days.

(21) Appl. No.: 12/201,085

(22) Filed: Aug. 29, 2008

(65) Prior Publication Data

US 2009/0060426 A1 Mar. 5, 2009

(30) Foreign Application Priority Data

Aug. 29, 2007 (KR) .................. 10-2007-0087083

(51) Int. Cl.
 *G02B 6/36* (2006.01)
(52) U.S. Cl. ........................................... 385/92
(58) Field of Classification Search .............. 385/92
 See application file for complete search history.

(56) References Cited

U.S. PATENT DOCUMENTS

| 7,581,891 B2 * | 9/2009 | Wang ................. 385/89 |
| 2003/0002824 A1 * | 1/2003 | Chan et al. ............ 385/92 |
| 2003/0201462 A1 * | 10/2003 | Pommer et al. ........ 257/200 |
| 2006/0153506 A1 * | 7/2006 | Cheng et al. ......... 385/88 |
| 2009/0060426 A1 * | 3/2009 | Lee et al. ............. 385/92 |

FOREIGN PATENT DOCUMENTS

KR 2007-10716 1/2007

* cited by examiner

*Primary Examiner* — Uyen Chau N Le
*Assistant Examiner* — Hoang Tran
(74) *Attorney, Agent, or Firm* — Cha & Reiter, LLC (57) ABSTRACT

An optical module having a second connector unit mounted on the bottom of a first connector unit to reduce the size of the radiation member and the optical module. The optical module includes a first connector unit, a radiation member provided on a first side of the first connector unit to support the first connector unit and radiate heat, a second connector provided on the first connector unit to electrically connect the first connector unit to a PCB, and a fastening member provided on surfaces of the first and second connector units, which face each other, to fasten the first and second connectors to each other. The optical module is advantageous reduces the size of the radiation member and renders a more compact optical module.

16 Claims, 7 Drawing Sheets

OPTICAL MODULE

CLAIM OF PRIORITY

This application claims the benefit under 35 U.S.C. §119(a) of an application entitled "Optical Module" filed in the Korean Intellectual Property Office on Aug. 29, 2007 and assigned Serial No. 2007-87083, the contents of which are hereby incorporated by reference in its entirety.

BACKGROUND OF THE INVENTION

1. Field of the Invention

The present invention relates to an optical module. More particularly, the present invention relates to an optical module that reduces the size of a radiation member.

2. Description of the Related Art

As generally known in the art, electronic devices tend to incorporate more functions and become more complicated in this era of ubiquitous computing, and research has been conducted in connection with multi-channel optical modules for transmitting signals to share data or information between devices. Methods for transmitting large-capacity signals include utilizing multiplexing and/or increasing the modulation rate of a transceiver.

The realization of a high modulation rate generally has a number of technological or economical problems, and a multiplexing method is commonly used. As used herein, the modulate rate (or baud rate) is a rate type indicating an amount of information transmitted per unit time, and refers to the maximum number of modulations per second. Modules based on MMF (Multi-Mode Fiber) arrays have been proposed and are used to transmit large-capacity signals. Conventional optical modules include 12-channel transmitters and receivers, or may have respective 4-channel transceivers.

Figure 1:
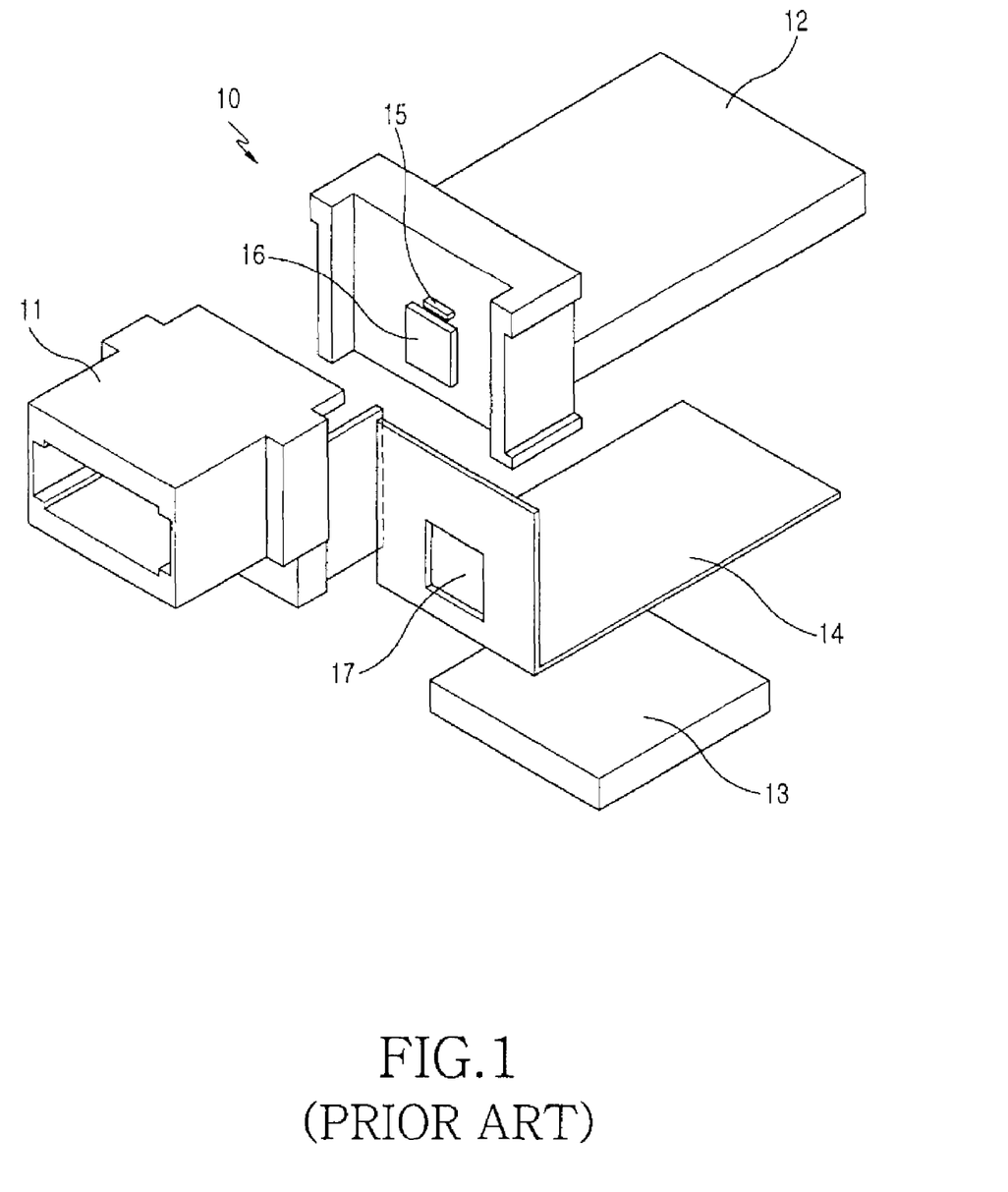
FIG. 1 is an exploded perspective view showing the construction of an optical module according to the prior art.

FIG. 1 is an illustration of a conventional optical module, which includes an MPO (Multi-Fiber Push On) connector 11 to be fastened to a multi-channel MMF; a PCB (not shown), a BGA (Ball Grid Array) connector 13 for facilitating electrical connection between the MPO connector 11 and the PCB; a FPCB (Flexible Printed Circuit Board) 14 for electrically connecting the BGA connector 13 to an IC (Integrated Circuit) 16; and a heat block 12 for emitting heat generated by the IC 16. The optical module 10 is mounted on the PCB (not shown). The MPO connector 11 has a high-density backplane for a communication system or data transmission, and a multi-fiber 15 provided on the PCB. The BGA connector 13 is positioned on the bottom of the heat block 12 to electrically connect to the IC 16 via the FPCB 14. Details regarding the BGA connector 13 is disclosed in Korean Patent Application No. 2005-0065516 (filed Jul. 19, 2005), entitled "BGA-TYPE CONNECTOR", the disclosure of which will now be described briefly. The BGA connector has input/output ports at a predetermined interval in the horizontal and vertical directions to increase the number of signal input/output ports of the IC. The input/output ports of the BGA connector have solder balls to maintain electric and mechanical contact with the PCB. The number of solder balls of the BGA connector, which act as contacts, can be increased easily to provide signal input/output ports at a high density in a small area.

Still referring to FIG. 1, the IC 16 is positioned on the front surface of the heat block 12, which has an optical device mounting recess formed therein so that an optical device 15 extends from the rear surface of the MPO connector 11 to the heat block 12. The FPCB 14 is mounted between the rear surface of the MPO connector 12 and the front surface of the heat block 12.

The vertical front portion of the FPCB 14 is positioned between the rear surface of the MPO connector 11 and the front surface of the heat block 12, and the lower portion of the FPCB 14 is positioned between the bottom of the heat block 12 and the BGA connector 13. The FPCB 14 has an IC connection recess 17 formed on the front portion to electrically connect to the IC 16, which is positioned on the front surface of the heat block 12, and to electrically connect to the BGA connector 13, which is mounted on the bottom of the FPCB 14.

However, such a conventional optical module 10, as shown in FIG. 1, has a problem in that, since the BGA connector 13 is positioned on the bottom of the heat block 12, the heat block 12 must be at least long enough to mount the BGA connector 13. The size of the heat block thus increases the size of the optical module 10, which then occupies a great deal of space when mounted on the PCB and degrades the efficiency of the PCB. In addition, the size of the heat block 12, which must be large enough for mounting of the BGA connector, increases the cost of the optical module.

SUMMARY OF THE INVENTION

Accordingly, the present invention provides an optical module having a BGA connector positioned on the bottom of an MPO connector, for reducing the size of the optical module.

The present invention also provides an optical module occupying reduced space on a PCB to improve the efficiency of the PCB.

In accordance with an exemplary aspect of the present invention, there is provided an optical module including a first connector unit; a radiation member provided on a first side of the first connector unit to support the first connector unit and radiate heat; a second connector provided on the first connector unit to electrically connect the first connector unit to a PCB; and a fastening member provided on surfaces of the first and second connector units, the surfaces facing each other, to fasten the first and second connectors to each other.

The second connector unit is typically provided beneath the first connector unit, and the radiation member has a first lateral surface adapted to face a first lateral surface of the first connector unit and a first lateral surface of the second connector unit.

The radiation member has a mounting recess formed on the first lateral surface and indented from a portion of the first lateral surface according to the size of the second connector unit, the first lateral surface of the radiation member facing the first lateral surface of the second connector unit.

The optical module may include an FPCB between the first connector unit and the radiation member and between the first connector unit and the second connector unit, and a coupling member for coupling the FPCB to the radiation member.

The coupling member may include a coupling hole provided on the FPCB to be mounted on the radiation member; a coupling recess provided on the radiation member to engage and couple with the coupling hole; and a coupling pin mounted into the coupling hole and the coupling recess to couple the coupling hole to the coupling recess.

The second connector unit is preferably adapted to protrude from the mounting recess of the radiation member when the FPCB is mounted on top of the second connector unit and when a lateral surface of the FPCB is mounted on a first side of the radiation member.

The fastening member may include at least one first fastening recess formed on the first connector unit to engage with the radiation member and to be mounted; at least one second fastening recess formed on the radiation member to engage with and abut the first fastening recess; and a fastening pin adapted to be inserted into the first and second fastening recesses to fasten the first connector unit to the radiation member, and the fastening member is adapted to fasten the first connector unit to the radiation member and to connect an optical fiber to an optical device when the first connector unit is fastened to the radiation member, the optical fiber being fastened from outside the first connector unit, the optical device being formed inside the first connector unit.

A first side of the fastening pin is preferably fastened to one of the first and second fastening recesses, and a second side of the fastening pin is inserted into the other of the first and second fastening recesses to couple the radiation member to the first side of the first connector unit.

The first connector unit has an opening formed on the first side so that an optical fiber can be fastened/unfastened, and a protrusion unit formed on a second side to engage and couple with at least one recess formed on a lateral surface of the radiation member, and the protrusion unit and the recess are adapted to engage and fasten with each other as soon as the fastening pin is inserted into the first and second fastening recesses.

The optical module may further include a coupling member between the first connector unit and the second connector unit and between the first connector unit and the radiation member to seal space between the first connector unit and the second connector unit and coupling portions of the first connector unit and the radiation member.

The coupling member may include, for example, epoxy, or can be created by welding.

BRIEF DESCRIPTION OF THE DRAWINGS

The above and other exemplary aspects, features and advantages of the present invention will be more apparent from the following detailed description taken in conjunction with the accompanying drawings, in which.

DETAILED DESCRIPTION

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein may be omitted when their inclusion would obscure appreciation of the subject matter of the present invention by a person of ordinary skill in the art.

As shown in FIGS. 2-6, an optical module 100 according to the present invention includes a first connector unit 110, a radiation member 120, a second connector unit 130, and a fastening member 160. The radiation member 120 is positioned on a lateral surface of the first connector unit 110, which has an opening formed on another lateral surface so that an optical fiber (not shown) can be inserted. The radiation member 120 is positioned on one side of the first connector unit 110 to support the first connector unit 110 and radiate heat. The second connector unit 130 is positioned on the first connector 110 to electrically connect the first connector 110 to a PCB (not shown). The fastening member 160 is positioned on surfaces of the first connector and 110 and radiation member 120, which face each other, to fasten the first connector 110 and radiation member 120 to each other.

Figure 2:
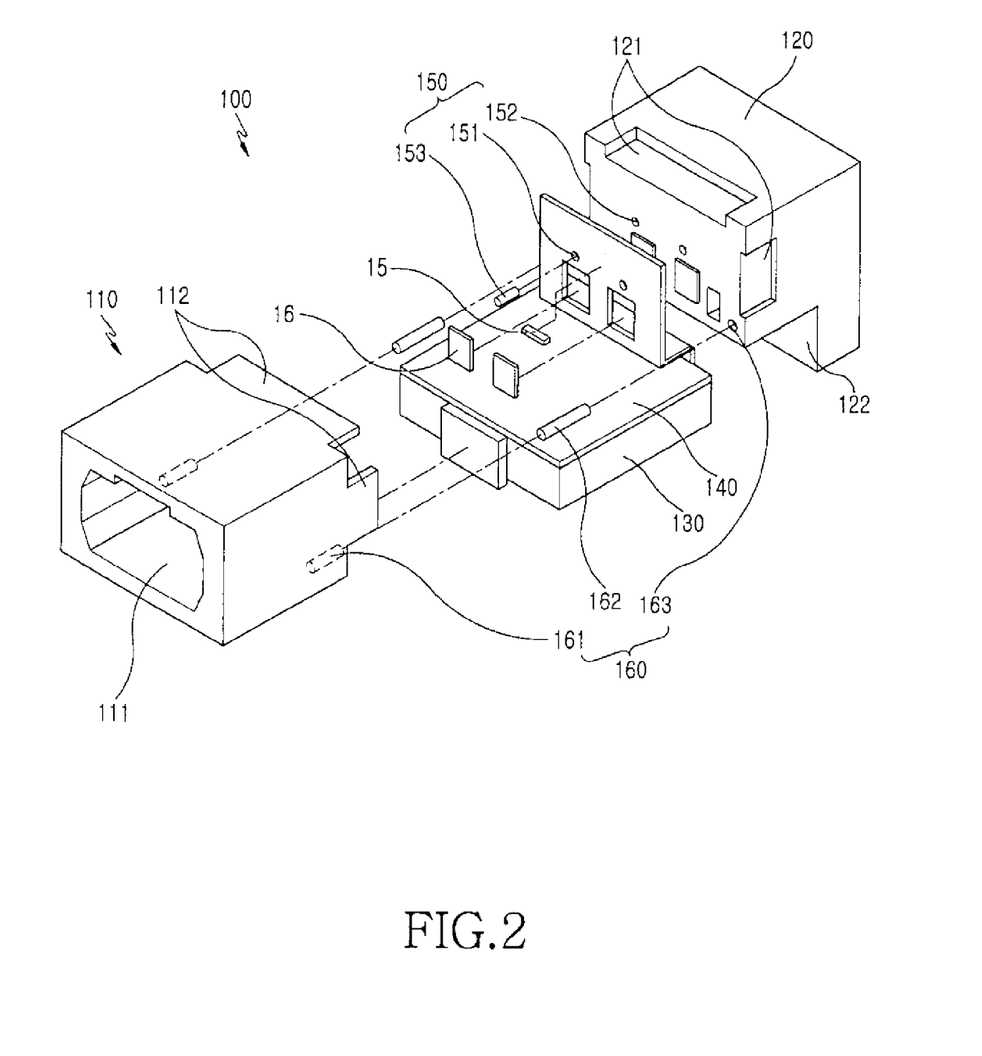
FIG. 2 is an exploded perspective view showing the construction of an optical module according to an exemplary embodiment of the present invention.
Figure 3:
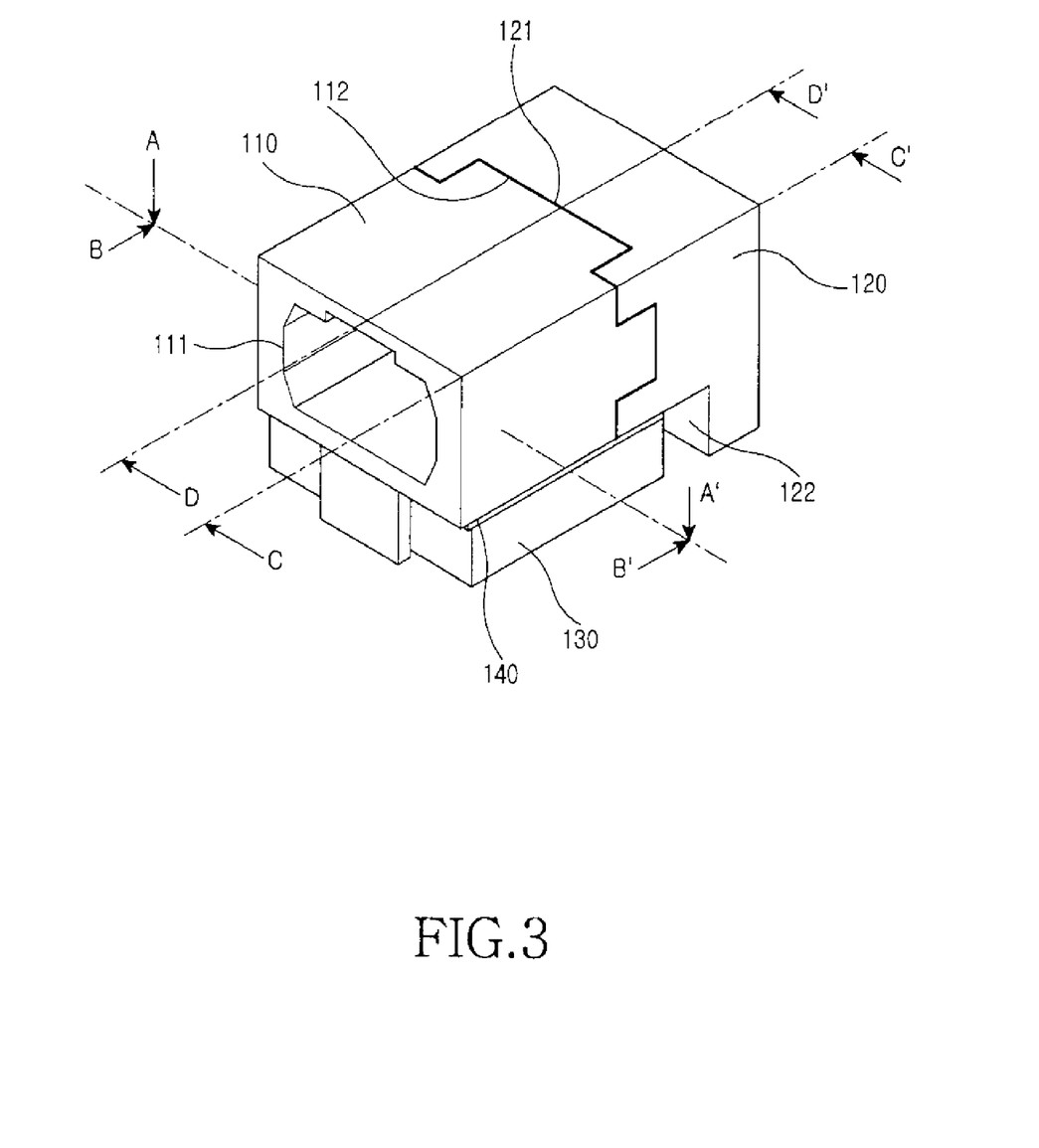
FIG. 3 is an assembled perspective view of an optical module according to an exemplary embodiment of the present invention.
Figure 6:
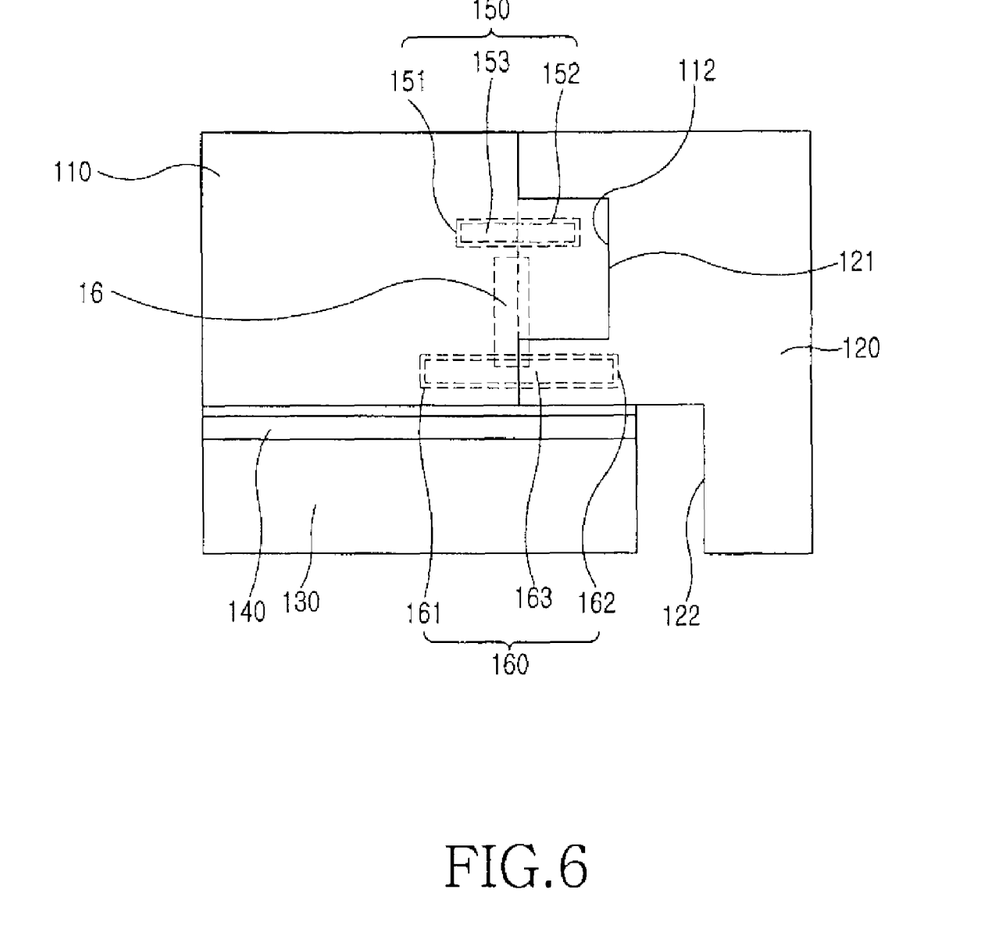
FIG. 6 is a front view showing the internal construction of the optical module shown in FIG. 3 when viewed from the front labeled C-C'.

As shown in FIGS. 2, 3, 6, and 7, the second connector 130 is positioned beneath the first connector 110, and the radiation member 120 has a surface adapted to face a lateral surface of the first connector unit 110 and a lateral surface of the second connector unit 130. As also shown in FIGS. 2, 3, and 6, the radiation member 120 has a mounting recess 122 formed on a lateral surface, which faces a lateral surface of the second connector unit 130. More particularly, the mounting recess 122 is formed by indenting a portion of the lateral surface of the radiation member 120 according to a size of the second connector unit 130, which is mounted beneath the first connector unit 110.

Figure 7:
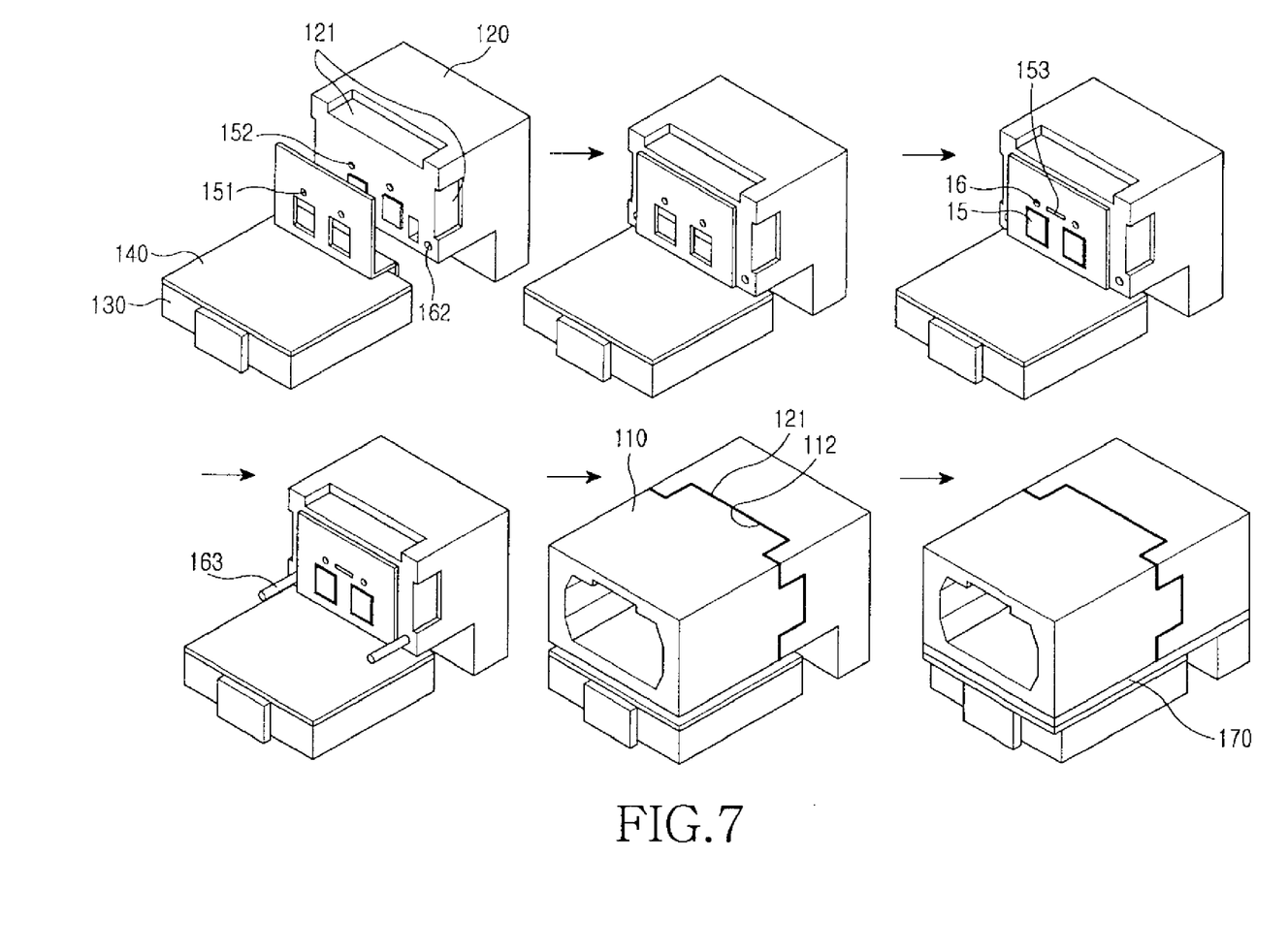
FIG. 7 is a perspective view showing a series of steps of assembling an optical module according to an exemplary embodiment of the present invention.

FIGS. 2 and 7 show a Flexible Printed Circuit Board (FPCB) 140 is positioned along both the first connector unit 110 and the radiation member 120, as well as between the first connector unit 110 and the second connector unit 130. The FPCB 140 and the radiation member 120 are provided with a coupling member 150 to couple the FPCB 140, which is positioned between the first connector unit 110 and the radiation member 120, to the radiation member 120.

Now referring to FIGS. 2, 4, 5, 6, and 7, the coupling member 150 includes a coupling hole 151, a coupling recess 152, and a coupling pin 153. The coupling hole 151 is formed on the FPCB 140 to be mounted on the radiation member 120. The coupling recess 152 is formed on the radiation member 120 to engage and couple with the coupling hole 151. The coupling pin 153 is mounted in the coupling hole 151 and the coupling recess 152 to couple the FPCB 140 to the radiation member 120. FIG. 7 shows the FPCB 140 is mounted on one side of the radiation member 120 while being mounted on top of the second connector unit 130. Then, the second connector unit 130 is positioned to protrude from the mounting recess 122 of the radiation member 120. FIGS. 2, 4, 5, 6, and 7 show that the fastening member 160 includes a first fastening recess 161, a second fastening recess 163, and a fastening pin 162. Particularly, at least one fastening recess 161 is formed on the first connector unit 110 to engage with the radiation member 120 and to be mounted. At least one second fastening recess 162 is formed on the radiation member 120 to engage with the first fastening recess 161 and abut it. The fastening pin 163 is inserted into the first and second fastening recesses 161 and 162 to fasten the first connector unit 110 to the radiation member 120.

Figure 4:
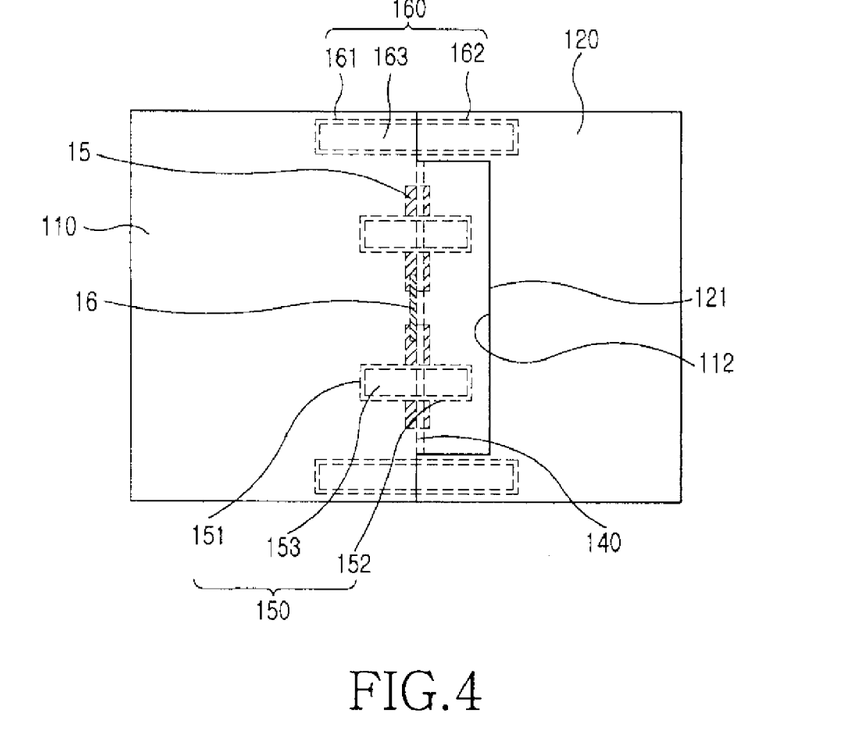
FIG. 4 is a top view showing the internal construction of the optical module shown in FIG. 3 when viewed from the top labeled A-A'.
Figure 5:
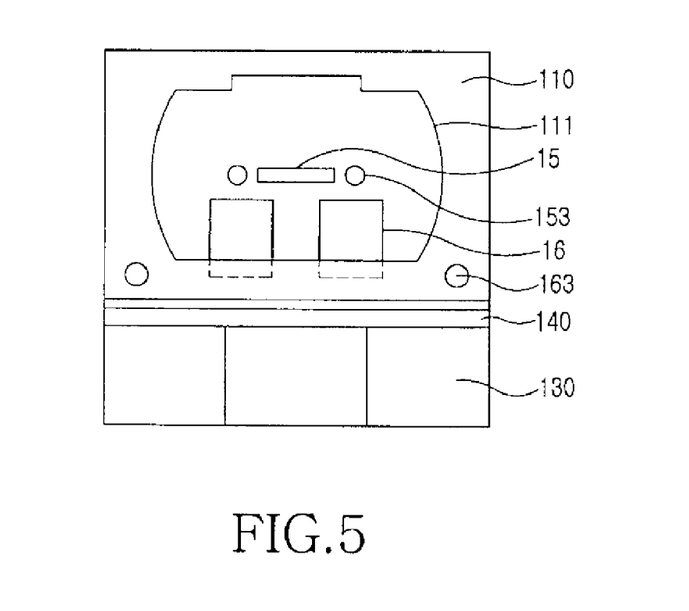
FIG. 5 is a front view showing the internal construction of the optical module shown in FIG. 3 when viewed from the lateral surface labeled B-B'.

FIGS. 2, 4, and 6 show the fastening member 160 being positioned on the first connector unit 10 and the radiation member 120 to fasten the first connector unit 110 to the radiation member 120 and to connect an optical fiber, which is fastened from outside the first connector unit 110, to an optical device 15 formed inside the first connector 110 when the first connector unit 110 and the radiation member 120 are fastened to each other. As best shown in FIGS. 2, 4, and 7, one side of the fastening pin 163 is fastened to one of the first and second fastening recesses 161 and 162, and the other side of the fastening pin 163 is inserted into the other of the first and second fastening recesses 161 and 162 so that one side of the first connector unit 110 is coupled to one side of the radiation member 120. The first connector unit 110 has an opening 111 formed on one side so that an optical fiber can be fastened/unfastened, and a protrusion unit 112 formed on the other side to engage and couple with at least one recess 121 formed on a lateral surface of the radiation member 120. The protrusion unit 112 and the recess 121 engage and fasten with each other as soon as the fastening pin 163 is inserted into the first and second fastening recesses 161 and 162.

Referring now to FIG. 7, a coupling member 170 is positioned between the first connector unit 110 and the second connector unit 130, as well as between the first connector unit 110 and the radiation member 120. The coupling member 170 is adapted to seal the space between the first connector unit 110 and the second connector unit 130 and to seal the coupling portions of the first connector unit 110 and the radiation member 120. The coupling member 170, for example, may comprise an epoxy, or can be created by welding.

The operation of the optical module 100 according to an exemplary embodiment of the present invention, which has the above-mentioned construction, will now be described in more detail with reference to FIGS. 2-8. As shown in FIGS. 2-8, in order to reduce the size of the optical module 100, the second connector unit 130 is fastened to the lower surface of the "⌐"-shaped FPCB 140. A lateral surface of the FPCB 140 is mounted on a lateral surface of the radiation member 120 while the FPCB 140 is mounted on the second connector 130, as shown in FIG. 7.

Figure 8:
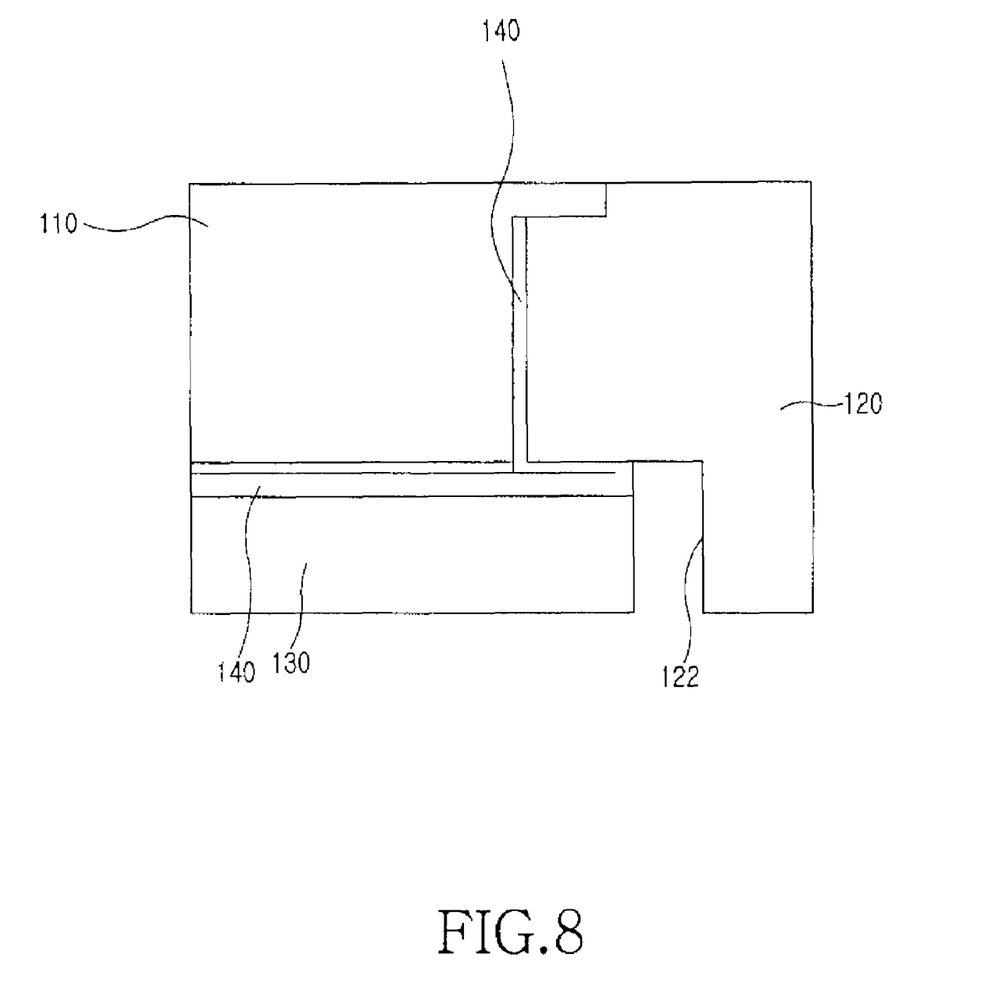
FIG. 8 is a side view of the optical module according to an exemplary embodiment of the present invention.

As shown in FIGS. 6 and 8, the mounting hole 151 of the FPCB 140 engages with the mounting recess 152 of the radiation member 120, and the IC mounting hole 17 of the FPCB 140 engages with the IC mounting hole 18 of the radiation member 120. Then, the mounting pin 153 is inserted into the mounting hole 151 and the mounting recess 152 to fix the FPCB 140 to the radiation member 120 and to fasten the IC 16 into the IC mounting hole 18 of the radiation member 120 via the IC mounting hole 17 of the FPCB 140. As a result, the second connector unit 130 is positioned to protrude from a lateral surface of the radiation member 120. If the second connector unit 130 is longer than the lower portion of the first connector unit 110, on which the second connector unit 130 is mounted, one side of the second connector unit 130 facing the radiation member 120 is inserted into the mounting recess 122, which has been formed by indenting a portion of a lateral surface of the radiation member 120.

The size of the mounting recess 122 can be modified as desired according to the length of the second connector unit 130. This means that, even if the second connector unit 130 is longer than the mounting portion of the first connector unit 110, the size of the optical module 100 can be reduced.

Referring now to FIGS. 2, 4, 5, and 7, the optical device 15 is mounted on the FPCB 140 and is positioned to engage with an optical fiber, which is inserted into the opening 111 of the first connector unit 110 later, so that data communication is possible. Then, the fastening pin 163 is inserted into at least one of the first fastening recess 161 of the first connector unit 110 and the second fastening recess 162 of the radiation member 120. One side of the guide pin 163 is inserted into the first fastening recess 161 or the second fastening recess 162, and the remaining portion of the fastening pin 163 protrudes outward. In other words, the other side of the fastening pin 163 protrudes from the first fastening recess 161 or the second fastening recess 162, into which the fastening pin 163 has been mounted, and is inserted into the remaining first fastening recess 161 or the second fastening recess 162.

For example, if one side of the fastening pin 163 is inserted and mounted into the first fastening recess 161 of the first connector unit 110, the other side of the fastening pin 163 protrudes from the first fastening recess 161 of the first connector unit 110.

The first connector unit 110 is then mounted on one side of the radiation member 120 so that the fastening pin 163, which protrudes from the first fastening recess 161, is inserted into the second fastening recess 152 of the radiation member 120. As a result, the first connector unit 110 is positioned on the top of the second connector unit 130 and is coupled to a lateral surface of the radiation member 120. If one side of the fastening pin 163 is inserted and mounted into the second fastening recess 162 of the radiation member 120, the other side of the fastening pin 163 protrudes from the second fastening recess 162 of the radiation member 120.

The first connector unit 110 is then mounted on one side of the radiation member 120 so that the fastening pin 163, which protrudes from the second fastening recess 162, is inserted into the first fastening recess 161 of the first connector unit 110. As a result, the first connector unit 110 is positioned on the top of the second connector unit 130 and is coupled to a lateral surface of the radiation member 120. At the same time, the protrusion units 112 formed on a surface of the first connector unit 110, which faces the radiation member 120, are inserted into the recesses 121 formed on a lateral surface of the radiation member 120, as shown in FIGS. 2-4. Consequently, the first connector unit 110 and the radiation member 120 are mechanically coupled to each other.

As shown in FIG. 7, a space may be created between the first and second connector units 110 and 130, as well as between the first connector unit 110 and the radiation member 120, during coupling. The coupling member 170 may be fastened to seal the coupling portions of the first and second connector units 110 and 130, as well as the coupling portions of the first connector unit 110 and the radiation member 120.

Therefore, according to the example shown and described herein above, by mounting the second connector unit 130 on the first connector unit 110 reduces the size of the radiation member 120 and, as a result, that of the optical module 100. In addition, since a compact optical module 100 is mounted on a PCB, the availability or efficiency of the PCB is improved.

While the invention has been shown and described with reference to certain exemplary embodiments thereof, it will be understood by those skilled in the art that various changes in form and details may be made therein without departing from the spirit and scope of the invention as defined by the appended claims. For example, although it has been assumed in the above description that the mounting pin 153 is inserted and mounted into the mounting hole 151 and the mounting recess 152 while the FPCB 140 and the radiation member 120 are mounted, it is also possible to position a pin-shaped protrusion on a portion of the radiation member 120 so as to engage with the mounting hole 151, into which the protrusion is inserted and mounted so that the FPCB 140 is mounted on the radiation member 120. The present invention is applicable to any type of optical module 100 for mounting a BGA connector unit 130. Also, recesses and associated protrusions can be arranged on some of the components reverse to that shown and described.

As mentioned above, the optical module according to the present invention is advantageous in that, by providing the first connector unit with a second connector unit, the size of the radiation member is reduced. This reduces the size of the optical module. In addition, by fastening the fastening pin into the first fastening recess of the first connector unit and the second fastening recess of the radiation member, the optical fiber manually inserted into the first connector unit is accurately aligned with the optical device concurrently with fastening the first connector unit to the radiation member. This improves the communication rate during data communication via the optical module. Furthermore, the reduced size of the optical module mounted on the PCB makes it possible to variously utilize the space of the PCB. The decrease in the area for mounting the optical module on the PCB increases the availability and efficiency of the PCB.

What is claimed is:

1. An optical module comprising: a first connector unit comprising a Multi-Fiber Push-On (MPO) connector having a front face with a recess for receiving a ferrule containing a multi-channel optical fiber;
    a radiation member provided along a rear face of the first connector unit for supporting the first connector unit and radiating heat;
    a second connector unit forming a vertical stack with the first connector unit for electrically connecting the first connector unit to a PCB and the second connector unit having a front face that is in substantial alignment with the front face of the first connector unit; and
    a fastening member provided on surfaces of the first connector unit and radiation member, the surfaces facing each other, for fastening the first connector unit and the radiation member to each other,
    wherein an uppermost surface of the second connector unit is positioned beneath a lowermost surface of the first connector unit; and wherein the radiation member having a mounting recess extends vertically to correspond substantially to a length of the vertically stacked first connector unit and second connector unit along the rear face of the first connector unit and a rear face of the second connector unit, and wherein the mounting recess is formed by indenting a portion of the front surface of the radiation member according to a size of the second connector unit mounted beneath the first connector unit.

2. The optical module as claimed in claim 1, wherein the second connector unit is coupled to at least a portion of the first connector unit via a coupling member.

3. The optical module as claimed in claim 2, wherein the radiation member has a mounting recess formed on a first lateral surface and indented from a portion of the first lateral surface according to a size of the second connector unit, the first lateral surface of the radiation member facing the rear face of the second connector unit.

4. The optical module as claimed in claim 2, further comprising a Flexible Printed Circuit Board (FPCB) arranged along the first connector unit and the radiation member and between the first connector unit and the second connector unit, and the coupling member for coupling the FPCB to the radiation member.

5. The optical module as claimed in claim 4, wherein the coupling member comprises:
    a coupling hole provided on the FPCB to be mounted on the radiation member;
    a coupling recess provided on the radiation member to engage and couple with the coupling hole; and
    a coupling pin mounted in the coupling hole and the coupling recess to couple the coupling hole to the coupling recess.

6. The optical module as claimed in claim 5, wherein the second connector unit protrudes from the mounting recess of the radiation member when the FPCB is mounted on top of the second connector unit and when a lateral surface of the FPCB is mounted on a first side of the radiation member.

7. The optical module as claimed in claim 1, wherein the fastening member comprises:
    at least one first fastening recess formed on the first connector unit to engage with the radiation member;
    at least one second fastening recess formed on the radiation member to engage with and abut the first fastening recess; and
    a fastening pin adapted to be inserted into the first and second fastening recesses to fasten the first connector unit to the radiation member, and
    the fastening member fastens the first connector unit to the radiation member and to connect an optical fiber to an optical device when the first connector unit is fastened to the radiation member, the optical fiber being fastened from outside the first connector unit, the optical device being formed inside the first connector unit.

8. The optical module as claimed in claim 7, wherein a first side of the fastening pin is fastened to one of the first and second fastening recesses, and a second side of the fastening pin is inserted into the other of the first and second fastening recesses to couple the radiation member to the first side of the first connector unit.

9. The optical module as claimed in claim 7, comprising a protrusion unit formed on a second side to engage and couple with at least one recess formed on a lateral surface of the radiation member, and wherein the protrusion unit and the recess are adapted to engage and fasten with each other via arrangement of the fastening pin into the first and second fastening recesses.

10. The optical module as claimed in claim 1, further comprising a coupling member between the first connector unit and the second connector unit and between the first connector unit and the radiation member to seal space between the first connector unit and the second connector unit and coupling portions of the first connector unit and the radiation member.

11. The optical module as claimed in claim 10, wherein the coupling member comprises epoxy or a weld.

12. The optical module as claimed in claim 5, wherein the FPCB is mounted on the second connector unit, the second connector unit is mounted on a first side of the radiation member to protrude from the first side, an IC is mounted into an IC connection recess of the radiation member, an optical device is mounted on the FPCB, a first side of the fastening pin is mounted into one of the first fastening recess of the first connector unit and the second fastening recess of the radiation member, a second side of the fastening pin is mounted into the other of the first and second fastening recesses so that the first connector unit is positioned on a top of the second connector unit and on a lateral surface of the radiation member, and a coupling member arranged for sealing between the first connector unit and the second connector unit and between the first connector unit and the radiation member.

13. An optical module comprising:
- a first connector unit comprising a Multi-Fiber Push-On (MPO) connector having a front face with a recess for receiving a ferrule containing a multi-channel optical fiber;
- a radiation member provided along a rear face of the first connector unit for supporting the first connector unit and for radiating heat; and
- a second connector unit forming a vertical stack with the first connector unit for electrically connecting the first connector unit to a PCB and the second connector unit having a front face that is in alignment with a front face of the first connector unit,
- wherein an upper surface of the second connector unit is positioned beneath a lower surface of the first connector unit and wherein the radiation member having a mounting recess extends vertically to correspond substantially to a length of the vertically stack first connector unit and second connector unit along the rear face of the first connector unit and rear face of the second connector unit, and wherein the mounting recess is formed by indenting a portion of the front surface of the radiation member according to a size of the second connector unit mounted beneath the first connector unit.

14. A method of constructing an optical module comprising the steps of:
- Positioning a radiation member along a rear face of a first connector unit comprising a Multi-Fiber Push-On (MPO) connector;
- Arranging a second connector unit forming a vertical stack with the first connector for electrically connecting the first connector to a printed circuit board,
- Arranging a fastening member on surfaces of the first connector and radiation member, which face each other and fastening the first connector and the radiation member together,
- wherein an uppermost surface of the second connector unit is positioned beneath a lowermost surface of the first connector unit; and
- wherein the radiation member having a mounting recess extends vertically to correspond substantially to a length of the vertically stacked first connector unit and second connector unit along the rear face of the first connector unit and rear face of the second connector unit, and wherein the mounting recess is formed by indenting a portion of the front surface of the radiation member according to a size of the second connector unit mounted beneath the first connector unit.

15. The method according to claim 14, wherein the second connector is positioned beneath the first connector.

16. An optical module constructed according to the process recited in claim 15.

* * * * *